(12) United States Patent
Hashiguchi

(10) Patent No.: US 9,679,388 B2
(45) Date of Patent: Jun. 13, 2017

(54) REGION SEGMENTATION APPARATUS AND METHOD

(71) Applicant: CANON KABUSHIKI KAISHA, Tokyo (JP)

(72) Inventor: Noriyasu Hashiguchi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/951,693

(22) Filed: Nov. 25, 2015

(65) Prior Publication Data

US 2016/0155237 A1   Jun. 2, 2016

(30) Foreign Application Priority Data

Dec. 1, 2014   (JP) ................................. 2014-243376

(51) Int. Cl.
G06K 9/34      (2006.01)
G06T 7/00      (2017.01)
G06K 9/62      (2006.01)
G06T 7/11      (2017.01)

(52) U.S. Cl.
CPC ............ G06T 7/0081 (2013.01); G06K 9/622 (2013.01); G06T 7/11 (2017.01); *G06T 2207/10016* (2013.01); *G06T 2207/10024* (2013.01)

(58) Field of Classification Search
CPC .... G06K 9/6118; G06K 9/622; G06K 9/6218; G06T 7/0081; G06T 2207/10016; G06T 2207/10024; G06T 7/11

USPC .................................................. 382/173, 175
See application file for complete search history.

(56) References Cited

U.S. PATENT DOCUMENTS

| | | | |
|---|---|---|---|
| 6,567,936 B1* | 5/2003 | Yang ................. | G06F 17/30595 707/999.002 |
| 9,171,222 B2* | 10/2015 | Ishii ....................... | H04N 5/232 |
| 9,275,466 B2* | 3/2016 | Chen ..................... | G06T 7/0081 |
| 9,317,783 B2* | 4/2016 | Zhang ................ | G06K 9/00234 |
| 9,401,026 B2* | 7/2016 | Doppler .................. | G06T 7/408 |

(Continued)

OTHER PUBLICATIONS

Lakshmana Phaneendra Maguluri et al. (An Efficient De noising Based Clustering Algorithm for Detecting Dead Centers and Removal of Noise in Digital Images, 2013, IEEE).*

(Continued)

*Primary Examiner* — Kanjibhai Patel
(74) *Attorney, Agent, or Firm* — Carter, DeLuca, Farrell & Schmidt, LLP

(57) ABSTRACT

A region segmentation apparatus for segmenting an image into a plurality of regions by pixel data clustering comprises a clustering processing unit that clusters each pixel configuring the image to one of a plurality of representative data items based on respective pixel data. Based on pixel data belonging to each representative data item as a result of the clustering by the clustering processing unit, the plurality of representative data items used in the clustering are updated for a next clustering. The region segmentation apparatus further determines whether by the clustering a state in which a dead cluster should be resolved occurs, and, if it is determined that the state in which the dead cluster should be resolved occurs, changes representative data corresponding to the dead cluster to resolve the state.

16 Claims, 11 Drawing Sheets

(56) References Cited

U.S. PATENT DOCUMENTS

2013/0096835 A1* 4/2013 Chok ................ E21B 47/12
　　　　　　　　　　　　　　　　　　　　702/12

OTHER PUBLICATIONS

Achanta et al., "SLIC Superpixels", EPFL Technical Report 149300, Jun. 2010, pp. 1-15.
Ren et al., "gSLIC: a real-time implementation of SLIC superpixel segmentation" University of Oxford, Department of Engineering, Technical Report, Jun. 2011, pp. 1-6.
Maruyama, "Real-time K-Means Clustering for Color Images on Reconfigurable Hardware", International Conference on Pattern Recognition, Aug. 2006, pp. 816-819.

* cited by examiner

REPRESENTATIVE DATA INITIAL ALLOCATION

RELATION BETWEEN REPRESENTATIVE DATA AND PIXEL

REPRESENTATIVE DATA INDEXES

REGION SEGMENTATION RESULT (LABEL MAP)

OVERLAPPING PARTIAL REGIONS

SET PARTIAL REGIONS

RESULT OF REGION SEGMENTATION OF IMAGE IN WHICH BLACK OBJECT APPEARS

RESULT OF CORRECTING DEAD CLUSTER AND CLUSTERING PROCESSING

RESULT OF REGION SEGMENTATION OF WHITE IMAGE

STATE IN WHICH DEAD CLUSTER OCCURS

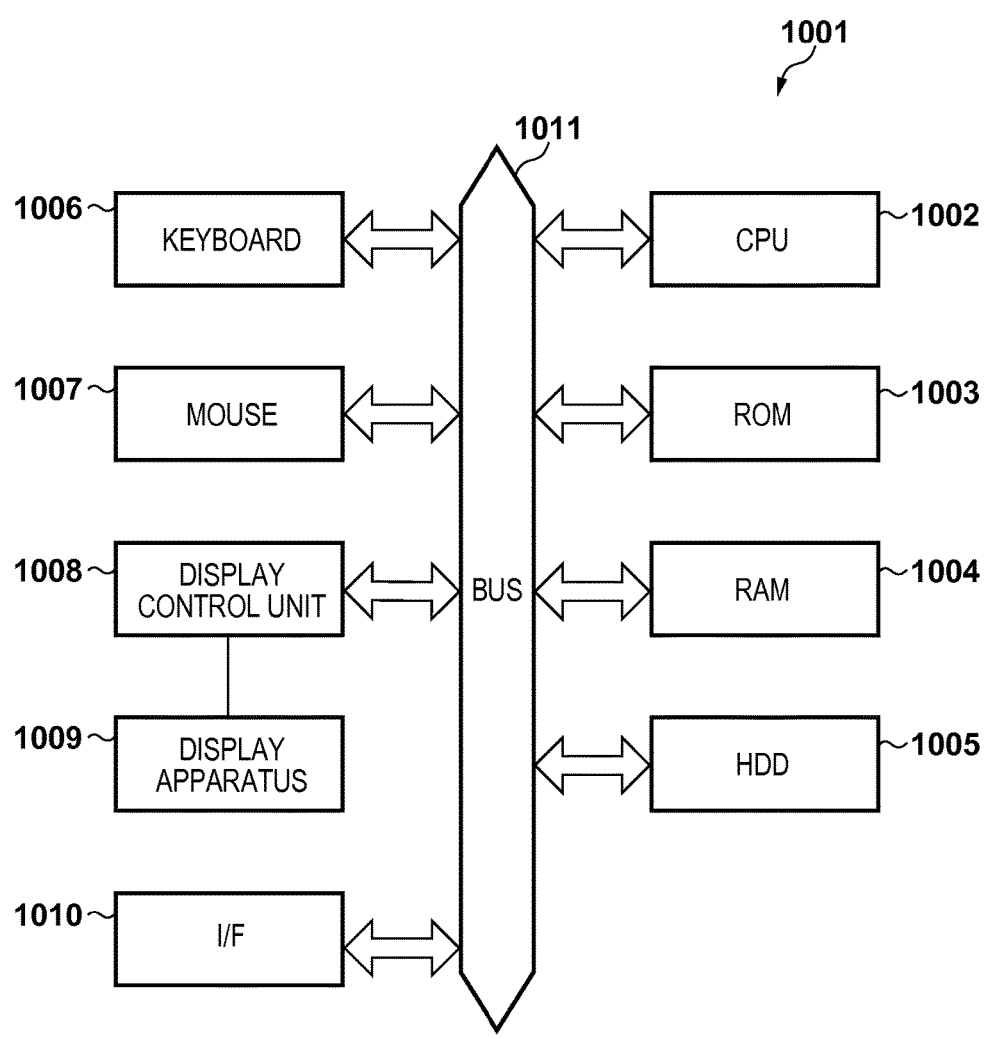
F I G. 10

REGION SEGMENTATION APPARATUS AND METHOD

BACKGROUND OF THE INVENTION

Field of the Invention

The present invention relates to an image region segmentation apparatus and method.

Description of the Related Art

A region segmentation method is used as a technique for segmenting an image into a plurality of regions so attributes such as color, pattern, brightness or the like, of respective regions become the same. After the regions are thus segmented, various image processing can be performed in units of regions, and therefore it is possible to reduce a computation amount compared to a case where an image is processed in units of pixels.

Several methods for accelerating region segmentation processing have been proposed. In these, a method for dividing an image into a plurality of regions by clustering pixel data using 5-dimensional information having color information (l, a, b) and coordinates (X, Y) is disclosed in "R. Achanta, A. Shaji, K. Smith, A. Lucchi, P. Fua, and S. Süsstrunk, "SLIC Superpixels," tech. rep., EPFL, EPFL, 2010." (document 1). The method of document 1 is referred to as Simple Linear Iterative Clustering (SLIC). First of all, representative data which are the center of clusters are allocated in a reticular pattern in an image. The representative data in the SLIC method holds 5-dimensional information having color information (l, a, b) and coordinates (X, Y). Note that the representative data is also referred to as a seed or a cluster centroid. The SLIC method is based on a k-means method which is one type of clustering, and clusters pixel data for representative data allocated in a reticular pattern. Also, using 5-dimensional information of the clustered pixel data, each representative data item is updated and clustered once again. In the SLIC method, a region segmentation result is obtained by repeating such clustering and representative data updating one or more times. A difference between the SLIC method and the k-means method is in the point that the range of pixel data that is clustered to representative data is limited to a predetermined range. A region obtained by clustering is referred to as a superpixel.

Also, accelerating the method of document 1 by a Graphic Processing Unit (GPU) is disclosed in "C. Y. Ren and I. Reid. gSLIC: a real-time implementation of SLIC superpixel segmentation. University of Oxford, Department of Engineering, Technical Report, 2011." (document 2). In document 2, a hierarchical clustering scheme for realizing high speed processing by a GPU has been proposed, and high speed region segmentation processing for a high-resolution image is realized.

Also, in "T. Maruyama, "Real-time K-Means Clustering for Color Images on Reconfigurable Hardware", International Conference on Pattern Recognition, pp. 816-819, 2006" (document 3), it is disclosed that a representative data initialization method is contrived and k-means processing is accelerated. In document 3, it is proposed that when a plurality of similar images are processed in order, by performing acceleration by processing the first image as normal, and using the representative data obtained in the previous image from the second image on, a repetition count is reduced.

However, if the method of acceleration as in document 3 is applied to a moving image, when a large change in the image occurs such as when the camera is moved or when there is a scene change, a phenomenon in which the pixel data is not clustered to any of the representative data occurs. Such a phenomenon is referred to as a dead cluster, a dead centroid, an empty cluster, or the like (hereinafter referred to as a dead cluster in the present specification). When a dead cluster occurs, the number of regions is reduced, and the precision of the region segmentation is degraded.

SUMMARY OF THE INVENTION

By virtue of embodiments, a region segmentation apparatus and method for suppressing a reduction in usable representative data in clustering due to the occurrence of a dead cluster, and reducing a degradation in the precision of region segmentation is provided.

According to one aspect of the present invention, there is provided a region segmentation apparatus for segmenting an image into a plurality of regions by pixel data clustering, the apparatus comprising: a clustering unit configured to cluster each pixel configuring the image to one of a plurality of representative data items based on respective pixel data; an update unit configured to, based on pixel data belonging to each representative data item as a result of the clustering by the clustering unit, update the plurality of representative data items for a next clustering; a determination unit configured to determine whether by the clustering a state in which a dead cluster should be resolved occurs; and a change unit configured to, if it is determined that the state in which the dead cluster should be resolved occurs, change representative data corresponding to the dead cluster to resolve the state.

Also, according to another aspect of the present invention, there is provided a region segmentation method performed by a region segmentation apparatus for segmenting an image into a plurality of regions by pixel data clustering, the method comprising: clustering each pixel configuring the image to one of a plurality of representative data items based on respective pixel data; based on pixel data belonging to each representative data item as a result of the clustering, updating the plurality of representative data items for a next clustering; determining whether by the clustering a state in which a dead cluster should be resolved occurs; and if it is determined that the state in which the dead cluster should be resolved occurs, changing representative data corresponding to the dead cluster to resolve the state.

Furthermore, according to another aspect of the present invention, there is provided a non-transitory computer readable storage medium storing a program for causing a computer to execute a region segmentation method for segmenting an image into a plurality of regions by pixel data clustering, the method comprising: clustering each pixel configuring the image to one of a plurality of representative data items based on respective pixel data; based on pixel data belonging to each representative data item as a result of the clustering, updating the plurality of representative data items for a next clustering; determining whether by the clustering a state in which a dead cluster should be resolved occurs; and if it is determined that the state in which the dead cluster should be resolved occurs, changing representative data corresponding to the dead cluster to resolve the state.

Further features of the present invention will become apparent from the following description of exemplary embodiments with reference to the attached drawings.

BRIEF DESCRIPTION OF THE DRAWINGS

FIG. 10 is a block diagram for illustrating an example configuration of an information processing apparatus that realizes a region segmentation apparatus.

DESCRIPTION OF THE EMBODIMENTS

Below, detailed explanation of several preferred embodiments of the present invention is given with reference to the attached drawings.

Figure 1:
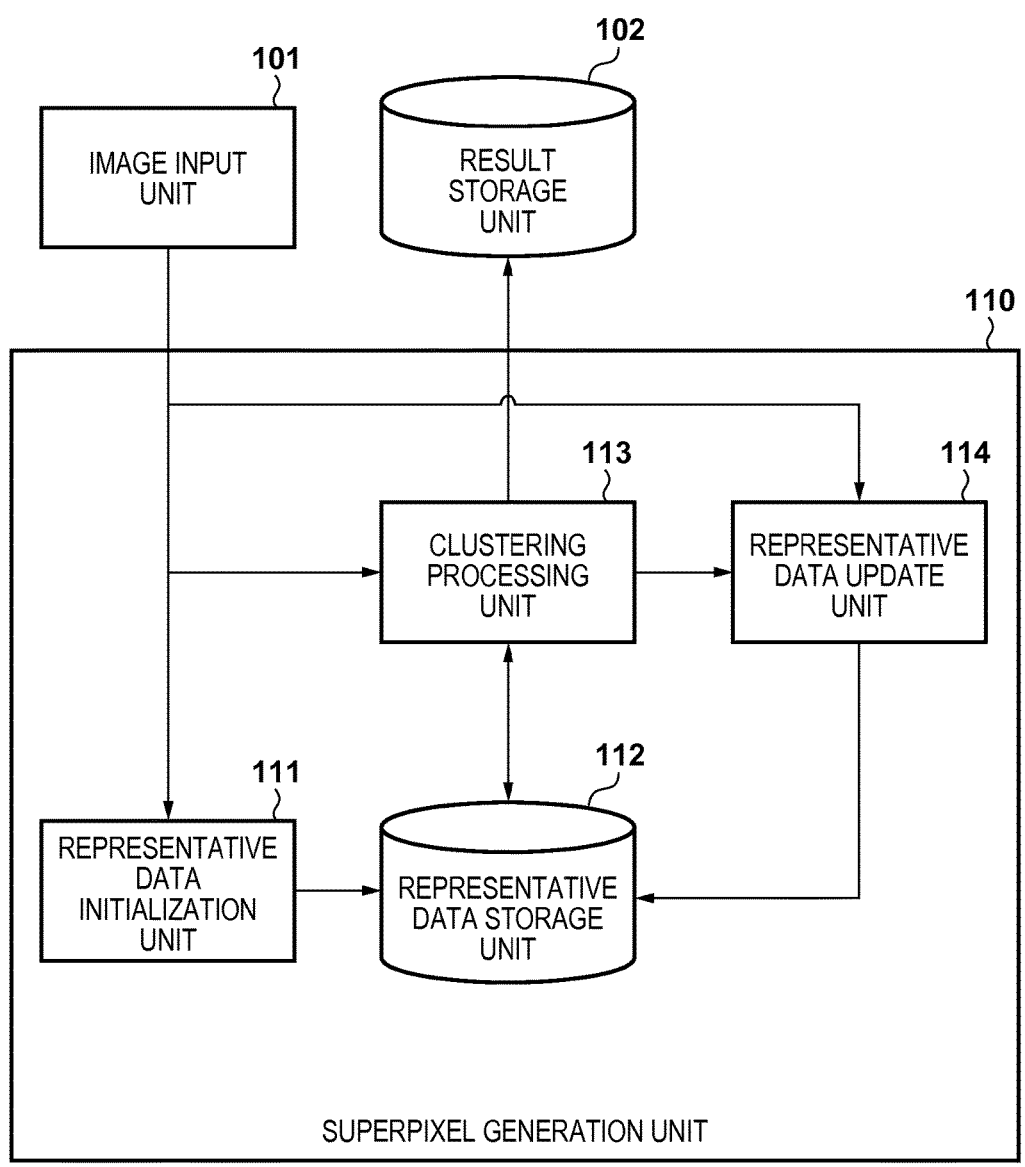
FIG. 1 is a block diagram for illustrating an example of a functional configuration of a region segmentation apparatus in accordance with embodiments.
Figure 2:
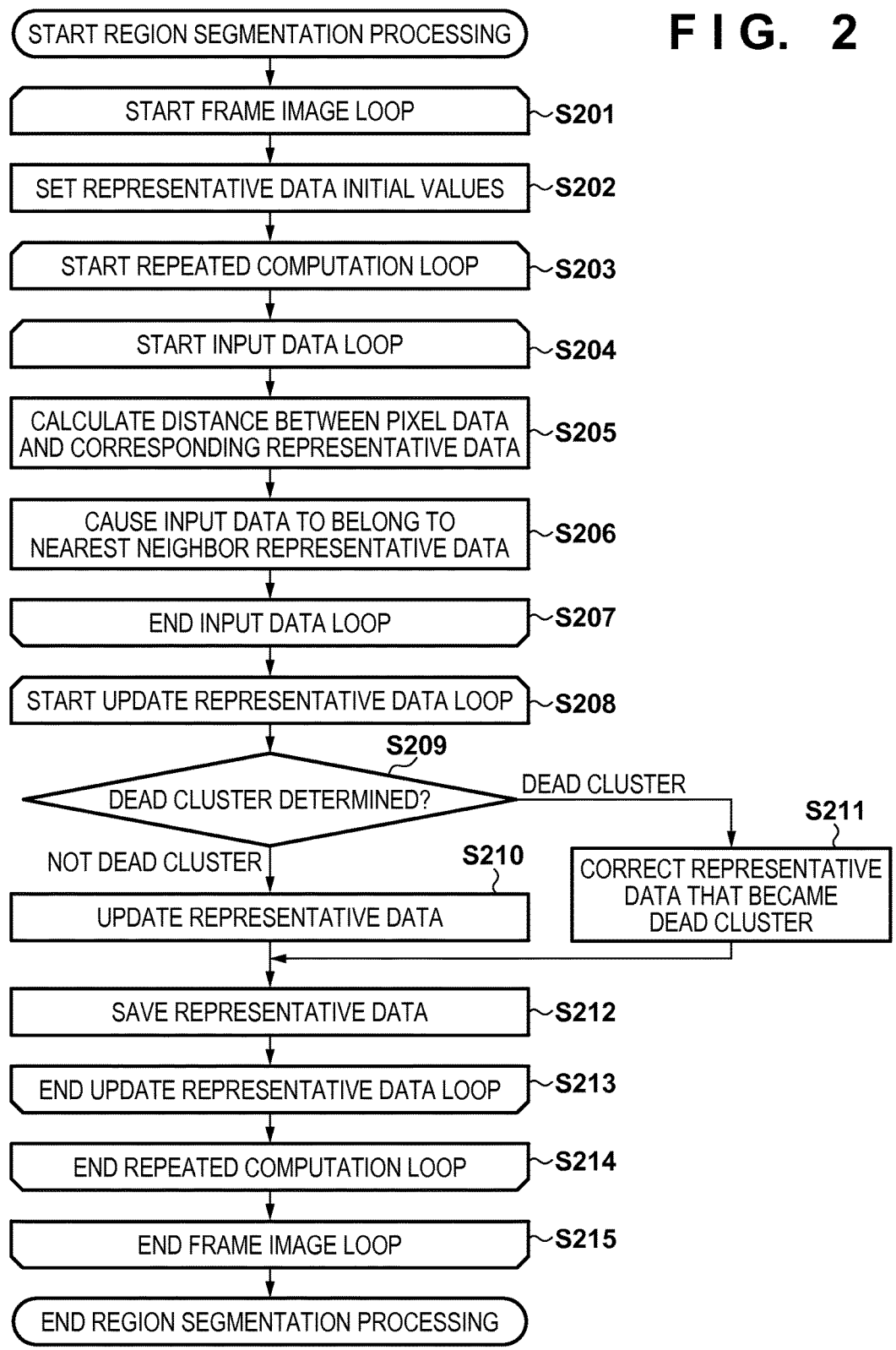
FIG. 2 is a flowchart for illustrating region segmentation processing in accordance with embodiments.

FIG. 1 is a block diagram for showing a functional configuration of a region segmentation apparatus according to this embodiment, and FIG. 2 is a flowchart indicating region segmentation processing according to this embodiment. In FIG. 1, an image input unit 101 is configured by a driver circuit that controls an optical system device, a photoelectric conversion device and a sensor/an AD converter/a signal processing circuit responsible for various image correction/a frame buffer, or the like. A function of the image input unit 101 images input light, and outputs image data. The image data handled in the present embodiment is assumed to be RGB color images for which visible light beam is imaged. Additionally, a gray image that represents luminance, and an image that captures an ultraviolet band or an infrared band of invisible light can be used. The input image type and format do not limit the present invention. Also, in the present embodiment a configuration for performing image capturing is exemplified as the image input unit 101, but a configuration may be taken in which image data (for example, moving images) which becomes the target of processing is read from a storage apparatus.

A superpixel generation unit 110 generates superpixels by segmenting (region segmentation processing) an image obtained by the image input unit 101 into a plurality of regions by clustering based on pixel data. In the present embodiment, explanation is given of an example using superpixel generation based on SLIC which is used in document 2. Also, in the present embodiment, explanation is given of an example using color information (R, G, B) of pixel data as an image feature.

A moving image is input for every frame from the image input unit 101, and a result that is processed by the superpixel generation unit 110 (a region segmentation result) is output to a result storage unit 102 and stored. In the superpixel generation unit 110, a clustering processing unit 113 clusters pixel data to representative data. Clustering is repeated one or more times making representative data set by a representative data initialization unit 111 be an initial value. The representative data is updated by a representative data update unit 114 in that repeating, and stored in a representative data storage unit 112. From the second frame on, representative data obtained by the region segmentation of the image of the previous frame is taken over, and clustering processing is performed.

Below, with reference to the flowchart of FIG. 2, detailed explanation is given of region segmentation processing according to this embodiment. Firstly, in step S201, the superpixel generation unit 110 starts a loop for processing frame images sequentially. Next, in step S202, the representative data initialization unit 111 sets initial values of representative data that the clustering processing unit 113 uses. In the present embodiment, the representative data holds 5-dimensional information having color information (R, G, B) and coordinates (X, Y). In the first loop for processing frame images sequentially, the representative data initialization unit 111 performs representative data initialization. From the second loop (from the second frame onward), the representative data initialization unit 111 takes over representative data obtained in the immediately preceding frame.

Figure 3A:
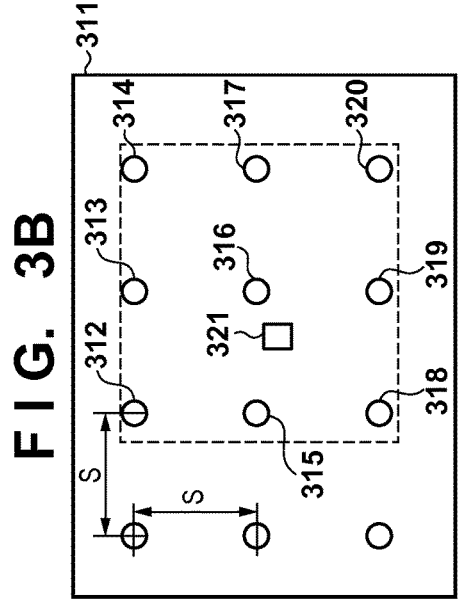
FIGS. 3A to 3D are views for explaining an initial allocation of representative data and region segmentation in accordance with embodiments.

An example of an initial allocation of the coordinates (X, Y) of representative data is illustrated in FIG. 3A. In FIG. 3A, reference numeral 301 represents an image, circular points represent positions in the image 301 of each representative data item, and S represents an interval between representative data items. For representative data 302, X and Y are respectively at the positions S/2 and S/2 where the top-left of the image is the origin. Also, the coordinates (X, Y) of each representative data item are set so as to be allocated in a reticular pattern with interval S where the representative data 302 is the starting point. Also, for the color information (R, G, B), the pixel values of the image 301 corresponding to the coordinates at which the representative data is allocated are set. The representative data initialized by the foregoing processing is saved to the representative data storage unit 112. Note that 12 items of representative data are set in FIG. 3A, but the number of the representative data is not limited to this.

In step S203, the clustering processing unit 113 sets a repetition count, and starts a repeated computation loop (step S203 to step S214). In the repeated computation loop, the clustering processing unit 113 clusters each pixel that configures the image to one of the plurality of representative data items based on the pixel data (step S204 to step S207). Also, in the repeated computation loop, the representative data update unit 114 updates the plurality of representative data items for a next clustering based on the pixel data belonging to each representative data item as the result of clustering (step S208 to step S213). A value of 1 or greater is set for the repetition count. By making the repetition count 2 or more, clustering by the clustering processing unit 113 and updating of the representative data by the representative data update unit 114 is executed a plurality of times for one image.

In step S204, the clustering processing unit 113 starts a loop for input data clustering processing. The input data is pixel data obtained from a frame image that is the target of processing. The clustering processing unit 113 clusters all of the input data by scanning from the top-left of the image in raster order, and repeating the processing from step S205 to step S206.

Figure 3B:
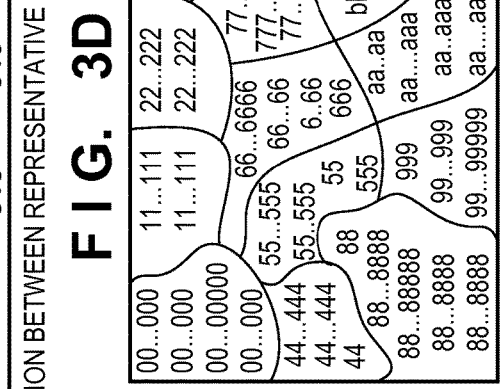

In step S205, the clustering processing unit 113 calculates a distance Ds between the pixel data and corresponding representative data. The correspondence relationship between the pixel data and the representative data is illustrated in FIG. 3B. In an image data 311, circular points represent the representative data, and pixel data 321 represents the target of the clustering processing. Pixel data is associated with 3×3 representative data items in its periphery. For example, the pixel data 321 is associated with 9 representative data items from representative data 312 to 320. The distance calculation in step S205 is performed between each pixel data item and the 3×3 representative data items in the periphery. An example of the calculation equation of the distance $D_s$ is illustrated in Equation (1).

$$d_{rgb} = \sqrt{(r_k - r_i)^2 + (g_k - g_i)^2 + (b_k - b_i)^2} \quad (1)$$
$$d_{xy} = \sqrt{(x_k - x_i)^2 + (y_k - y_i)^2}$$
$$D_s = d_{rgb} + \frac{m}{s} d_{xy}$$

In Equation (1), $r_k$, $g_k$, $b_k$ is the color information (R, G, B) of a k-th representative point, and $x_k$, $y_k$ are the coordinates (X, Y) of the k-th representative point. k takes a value from 0 to K−1 when the total number of representative points allocated at interval s is K. Also, $r_i$, $g_i$, $b_i$ is color information (R, G, B) of an i-th pixel, and $x_i$, $y_i$ are the coordinates (X, Y) of the i-th pixel. i is an index representing a pixel position in the image 301. m of Equation (1) is a parameter that represents a weight when adding a distance $d_{rgb}$ in a color space and a distance $d_{xy}$ in a coordinate space.

Figure 3C:
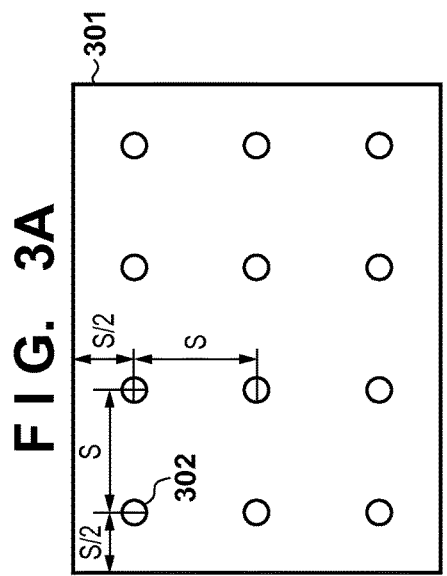
Figure 3D:
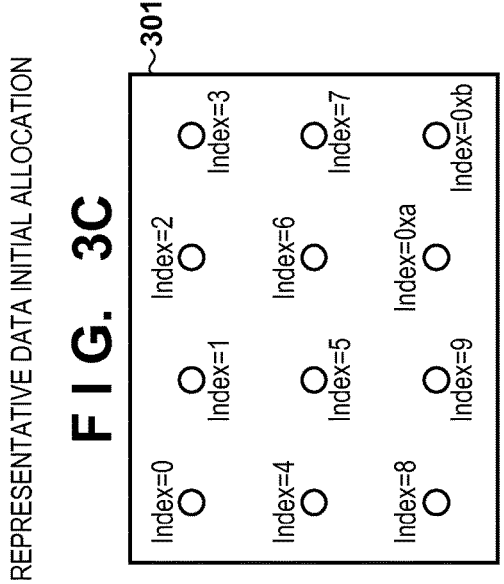

In step S206, the clustering processing unit 113 causes input data (pixel data of pixel i) to belong to the nearest neighbor representative data. More specifically, the clustering processing unit 113 selects the representative data whose distance is the smallest from out of the distance Ds between the pixel data of the pixel i and the 3×3 representative data items in its periphery, and causes the pixel data of the pixel i to belong to the selected representative data item. Additionally, the clustering processing unit 113 assigns an index such as is illustrated in FIG. 3C to the representative data items allocated in the image 301, and generates a label map as is illustrated in FIG. 3D making the indexes of the representative data selected for each pixel data item be label values. The clustering processing unit 113 sends the generated label map to the result storage unit 102, causing it to be stored as a region segmentation result.

In step S207, it is determined whether the clustering processing is executed for all input data. If the clustering processing has been executed for all of the input data, the processing proceeds to step S208, and the loop for the clustering processing on the input data (step S204 to step S207) terminates. If input data (pixel data) for which the clustering processing is not executed exists, the processing returns to step S204, and clustering processing is started for the next input data item.

Next, explanation is given for processing of the representative data update unit 114. In step S208, a loop for updating representative data (step S208 to step S213) is started. In the loop for updating the representative data, the representative data is selected one item at a time, and the following processing is executed for the selected representative data. Firstly, in step S209, the representative data update unit 114 determines whether or not a dead cluster occurs in the selected representative data. It is possible to determine that a dead cluster occurs by the number of pixel data items belonging to the representative data. If the number of pixel data items that to belong is zero, this represents that a dead cluster occurs.

If a dead cluster does not occur for the selected representative data, the processing proceeds to step S210. In step S210, the representative data update unit 114 obtains, based on the color information (R, G, B) and the coordinate information (X, Y) of the pixel data that belongs to the selected representative data, an update value for that representative data. In the present embodiment, the representative data update unit 114 calculates an accumulated value of the color information (R, G, B) and the coordinate information (X, Y) from the pixel data belonging to the representative data, and obtains respective average values by dividing by the number of pixel data items. The representative data update unit 114 makes the thus obtained average value of the color information (R, G, B) and the coordinate information (X, Y) be the update value of the color information (R, G, B) and the coordinate information (X, Y). In step S212, the representative data update unit 114 saves the representative data obtained in step S210 (update value) in the representative data storage unit 112.

Meanwhile, if a dead cluster is detected, the processing proceeds to step S211 from step S209. The representative data update unit 114 changes the representative data corresponding to the dead cluster that occurs in accordance with clustering by the clustering processing unit 113 in order to resolve the dead cluster state. Note that below, in order to clearly distinguish from updating of the representative data in step S210, a change in representative data for resolving such a dead cluster state is referred to as a correction. In the present embodiment, in step S211, the representative data update unit 114 corrects the representative data that became a dead cluster. Because pixel data that belongs to representative data that became a dead cluster does not exist, the dead cluster will persist as long as the same frame image is processed, and the number of representative data items is reduced substantially. Accordingly, in the present embodiment, representative data corresponding to a dead cluster that occurred in accordance with clustering is corrected based on pixel data of the frame image currently being processed so that it becomes representative data in which pixel data that belongs to it exists.

For this correction processing, various methods can be considered. In the present embodiment, using pixel data of a specific position corresponding to a position of the representative data that has become the correction target from among a plurality of specific positions set in advance in relation to the plurality of representative data items, the representative data that became the correction target is corrected. For example, when the processing of step S201 to step S215 is executed for frame images input sequentially, initial positions set for clustering for the initial frame image in step S202 are used as the plurality of specific positions set in advance. In other words, the representative data update unit 114:

assigns the initial allocation of the representative data (the allocation used to obtain the representative data in step S202 for the initial frame image) to the X, Y of the representative data obtains color information of pixel data of the position of the above described initial allocation from the image data currently being processed (frame image), and assigns that to R, G, B of the representative data.

By this, the representative data is corrected. Details of a dead cluster will be explained later. Next, the processing proceeds to step S212, and the corrected representative data is saved in the representative data storage unit 112.

In step S213, it is determined if the above described update processing is executed for all representative data. If the update processing has been executed for all of the representative data, the processing proceeds to step S204, and the representative data update loop (step S208 to step S213) terminates. Meanwhile, if there exists representative data for which update processing is not yet executed, the processing returns to step S209, and the representative data update unit 114 starts the above described update processing in accordance with step S209 to step S211 for the next representative data item.

In step S214, it is determined whether or not the number of times that the repeated computation loop (step S203 to step S214) executes exceeds a predetermined repetition count. If execution of the repeated computation loop exceeds the predetermined repetition count, the repeated computation terminates. In other words, processing for a frame image which is the current clustering processing target terminates, and the processing is advanced to step S215 to execute the clustering processing for the next frame image. Meanwhile, if execution of the repeated computation loop has been performed not more than the predetermined repetition count, the processing returns to step S204, and the next repeated computation starts. In the next the repeated computation, using the updated representative data (the representative data saved in step S212), the processing from step S204 to step S213 is executed. If the predetermined repeated computation terminates, the processing proceeds to step S215. Here, the label map saved in the result storage unit 102 is the region segmentation result for the frame image.

In step S215, the superpixel generation unit 110 determines whether or not inputting of frame images is finished. If it has finished, the frame image loop terminates. If it is not finished, the processing returns to step S202, and processing of the next frame image starts. In step S202, the initial values of the representative data are set. Because it is the second loop or greater, the representative data initialization unit 111 takes over and sets the representative data updated in the last loop of the repeated computation (step S203 to step S214) for the clustering processing of one frame previous. Then, the representative data that is taken over is set as an initial value, and the processing from step S203 to step S215 is performed.

Next, explanation is given of details of a dead cluster with reference to FIG. 8A to FIG. 8D. Here, explanation will be given of a situation in which a dead cluster occurs, and counter-measure method therefor. A dead cluster occurs when a large change occurs for the whole image or for a portion thereof. Here, explanation is given in an example of a dead cluster that occurs partially. For example, a partial change between frame images occurs due to a situation in which an object such as a person or a car crosses an area while capturing. More specifically, explanation will be given for an example in which a black object passes a background area for which a white wall is made to be the background.

Figure 8B:
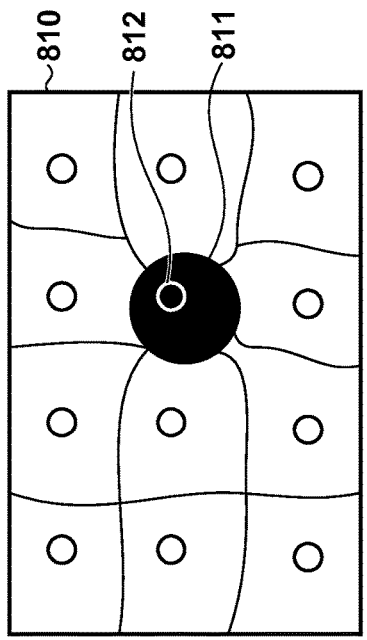
FIGS. 8A to 8D are views for explaining steps by which a dead cluster occurs.
Figure 8D:
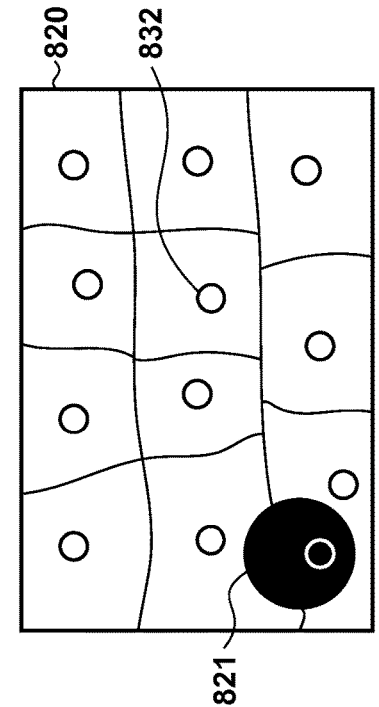
Figure 8A:
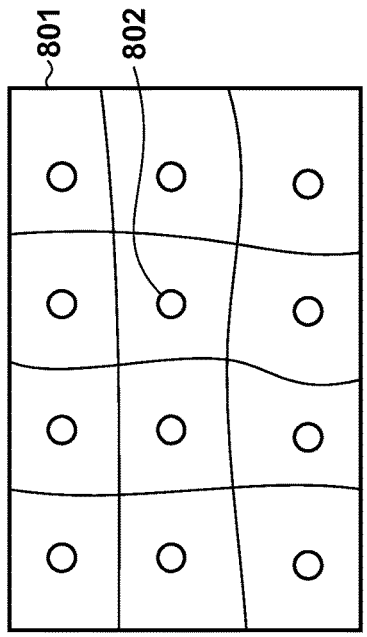

FIG. 8A is a result of a region segmentation of a frame image 801 for which a white wall appears on one surface. A round point indicated by reference numeral 802 is representative data. When the region segmentation of the frame image 801 is finished, the color information of each representative data item is white. Next, the result of a region segmentation of a frame image 810 when a physical object 811 which is black appears in the frame image 810 is illustrated in FIG. 8B. When representative data 812 takes over representative data 802, the representative data 812 is white, and the distance Ds, indicated by Equation 1, from black pixels in the periphery becomes larger, and so the representative data 812 becomes a dead cluster for which there does not exist pixel data that belongs. Accordingly, for the representative data 812, correction processing is applied in step S211. The result of this is that the black pixel data existing in the region of the black object is clustered to the representative data 812 whose coordinate distance is close. As a result of the region segmentation the color information of the representative data 812 becomes black.

Figure 8C:
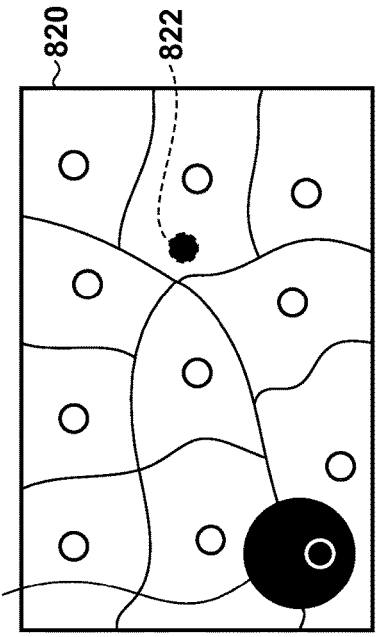

The result of the region segmentation in a frame image 820 in which the object 811 which is black moved to the position of reference numeral 821 is illustrated in FIG. 8C. When the clustering processing is performed on the frame image 820, the distance becomes large between the pixel data which is white and representative data 822 which is black, and because no pixel data belongs to the representative data 822 which is black, it becomes a dead cluster. Accordingly, correction processing is applied in step S211 to the representative data 822, and the dead cluster state is resolved.

In the present embodiment, if a dead cluster occurs, the corresponding representative data is corrected by pixel data at a position of the initial allocation. For example, by correcting the representative data 822, which is black, and which became a dead cluster to an initial allocation position and a pixel value of a pixel at that position, the dead cluster is resolved in the next repetitive process. The result of correcting the dead cluster and performing clustering processing in the frame image 820 illustrated in FIG. 8C is illustrated in FIG. 8D. By the representative data 822 being corrected to a pixel value (white) corresponding to an initial allocation position, a plurality of pixel data items come to belong to it, and a region is made by representative data 832. Also, because the position of the representative data becomes the position of the initial allocation by the correction, as illustrated in FIG. 8D, it is possible to resolve the dead cluster without a distribution of representative data being distorted.

As described above, by virtue of the present embodiment, if the representative data becomes a dead cluster due to clustering processing, it is possible to resolve a dead cluster in the next clustering processing by correcting representative data. With this, the occurrence of a dead cluster can be suppressed, and it is possible to minimize the degradation of the precision of the region segmentation.

Note that in the embodiments described above, explanation is given for a method which is based on SLIC for generation of superpixels, but the present invention is not limited to this. The present invention can be applied if a dead cluster occurs when performing region segmentation by clustering using the representative data. Also, in the embodiment described above, explanation is given for an example that uses color information (R, G, B) as an image feature that the pixel data has, but the present invention is not limited to this. For example, a color space such as CIELAB (l, a, b) or YCC (Y, Cb, Cr) may be used for the image feature.

Also, in the embodiments described above, explanation is given for a method of allocating representative data in a reticular pattern in initialization of the representative data, but the present invention is not limited to this. For example, the representative data may be allocated so as to be staggered, may be allocated randomly in a predetermined range, or may be allocated at some other positioning. Also, a method is illustrated in the SLIC method of document 1 in which when allocating in the reticular pattern, the edge of an object is detected, and allocation is performed by shifting a few pixels to a position where the value of the edge is low; configuration may be taken so as to determine an initial allocation of the representative data by using this method.

Also, in the above described embodiment, in order to correct the representative data that became a dead cluster, the initial allocation is used as the specific position of the representative data, but limitation is not made to this. For example, the coordinates of the representative data that became the dead cluster at that time may be used. Also, if the initial allocation is allocated randomly in a predetermined range, it is necessary to store the initial positions in a memory. This is because it is difficult to calculate the position of the re-initial allocation when correcting. Note that when correcting a dead cluster, randomly selected pixel data in a specific range corresponding to a representative data position which became a change target from specific ranges (for example, initial ranges) set in advance for each representative data item may be used. Alternatively, configuration may be taken such that when a dead cluster is corrected, selection is performed from a plurality of kinds of allocation positions such as those of a reticular pattern or a staggered pattern, and these are used as initial allocations.

Also, in the above described embodiment, explanation is given for a method that uses pixel data of a position of an initial allocation for a method of correcting when a dead cluster occurs, but the present invention is not limited to this. For example, correction may be performed by obtaining an average value between pixel data of interest of a position of an initial allocation and 4 neighboring or 8 neighboring pixel data items. Also, in the representative data update unit 114, a dead cluster is corrected with reference to the image data, but configuration may be taken such that a dead cluster is corrected with reference to representative data that neighbors the representative data that became a dead cluster based on an initial allocation of the representative data. In such a case, for example, the representative data of the dead cluster may be corrected by obtaining an average value of neighboring representative data items and interpolating. Neighboring representative data is for example neighboring representative data of 4 neighbors or 8 neighbors.

Also, in the embodiment described above, every time step S203 to step S214 are repeated, a label map is output to the result storage unit 102 (step S206), but the present invention is of course not limited to this. For example, because the last repetitive processing loop is known from the repetition count set in step S203, configuration may be taken such that the clustering processing unit 113 outputs the label map to the result storage unit 102 only on the final loop. Also, regarding the information output to the result storage unit 102, information of representative data may be output in place of the label map, and information of both the label map and the representative data may be output.

In addition, in the embodiment described above, explanation is given for a method of setting a predetermined number of times for the loop of step S203, but the present invention is not limited to this. For example, configuration may be taken such that the termination of the repeated computation is determined by whether or not a value of representative data converges. For the convergence, a Euclidean distance or a Manhattan distance between representative data before and after updating or correcting may be obtained, for example, and it can be determined whether or not that value falls below a predetermined threshold value. If it is determined to converge, the repeated computation loop according to step S203 to step S214 terminates, and if it does not converge, the processing returns to step S204, and the repeated computation is continued. In addition, the fact that a dead cluster does not occur may be used as the determination of termination of the repeated computation. In such a case, if a dead cluster does not occur, the repeated computation terminates, and if a dead cluster does occur, the processing returns to step S204, and the repeated computation is performed. As described above, repetition may be of a fixed number of times, and repetitive processing of a variable number of times based on a convergence condition may occur.

<First Variation>

Figure 4:
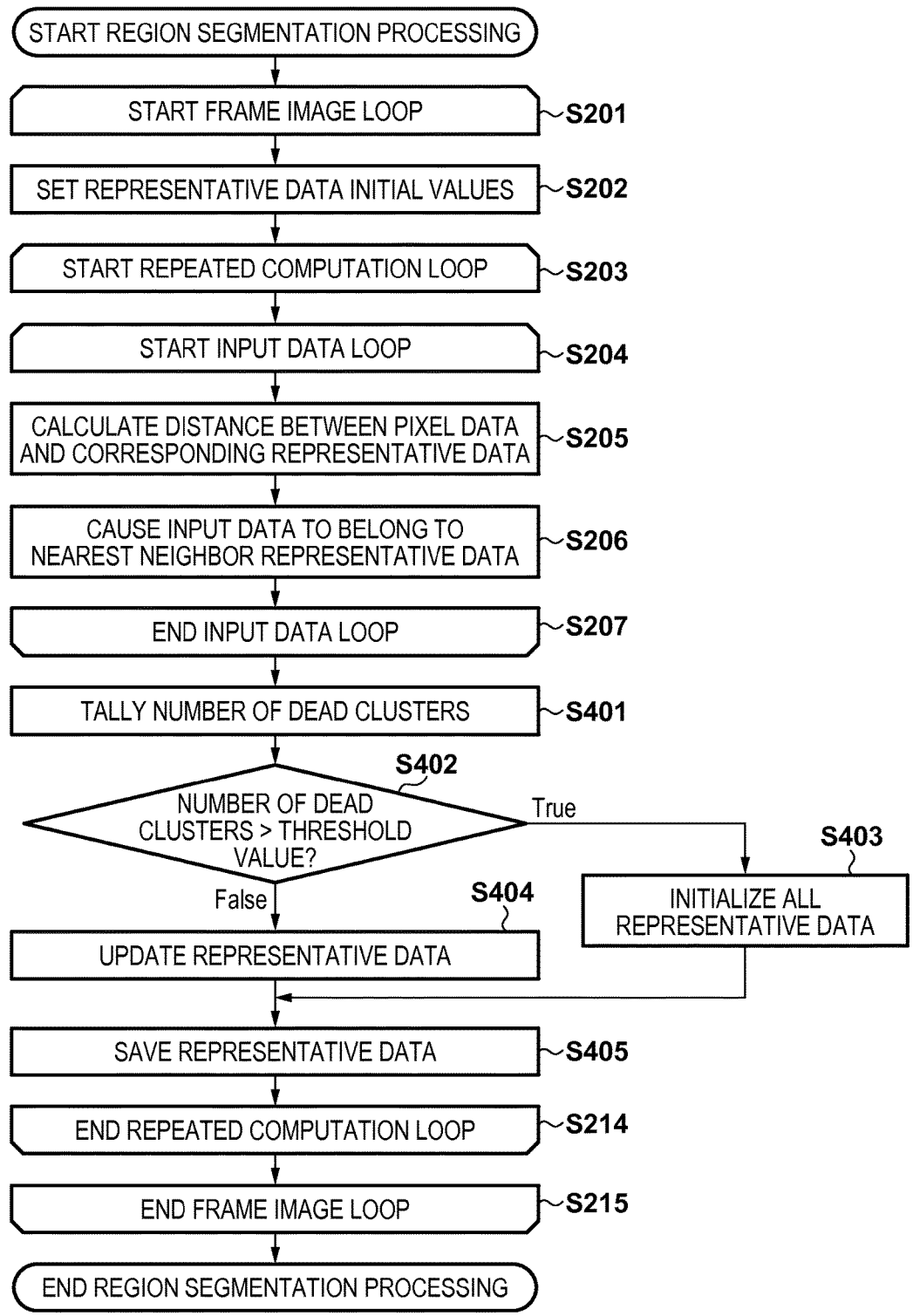
FIG. 4 is a flowchart for illustrating processing (First Variation) for correcting all representative data.

In the embodiments described above, explanation is given for a method in which for every execution of clustering by the clustering processing unit it is determined whether or not each of a plurality of representative data items is a dead cluster, and correction is performed for representative data that became a dead cluster. However, the present invention is not limited to this. For example, configuration may be taken such that if the number of representative data items that became dead clusters exceeds a predetermined threshold value, all representative data items are corrected, and if it is not more than the threshold value, none of the representative data items are corrected. In FIG. 4, a flowchart for explaining processing according to a first variation is illustrated. Note that the same reference numerals are added for processing that is similar to the processing illustrated in the flowchart of FIG. 2.

When the clustering processing for each pixel data item completes, the processing proceeds to step S401 from step S207. In step S401, the representative data update unit 114 counts the number of representative data items that became dead clusters. Next, in step S402, the representative data update unit 114 determines whether or not the number of dead clusters counted in step S401 exceeds a predetermined threshold value. If the number of dead clusters exceeds the predetermined threshold value, the processing proceeds to step S403, and the representative data update unit 114 corrects all of the representative data items. In the present example, by the method explained in step S211, each representative data item is initialized. Then, the processing proceeds to step S405, and the representative data update unit 114 saves the initialized representative data in the representative data storage unit 112.

If the number of dead clusters counted in step S401 is not more than a predetermined threshold value, the processing proceeds to step S404 from step S402. In step S404, the representative data update unit 114 updates each representative data item. This processing is the same as that of step S210. Next, the processing proceeds to step S405, and the representative data update unit 114 saves the updated representative data in the representative data storage unit 112.

<Second Variation>

Figure 5A:
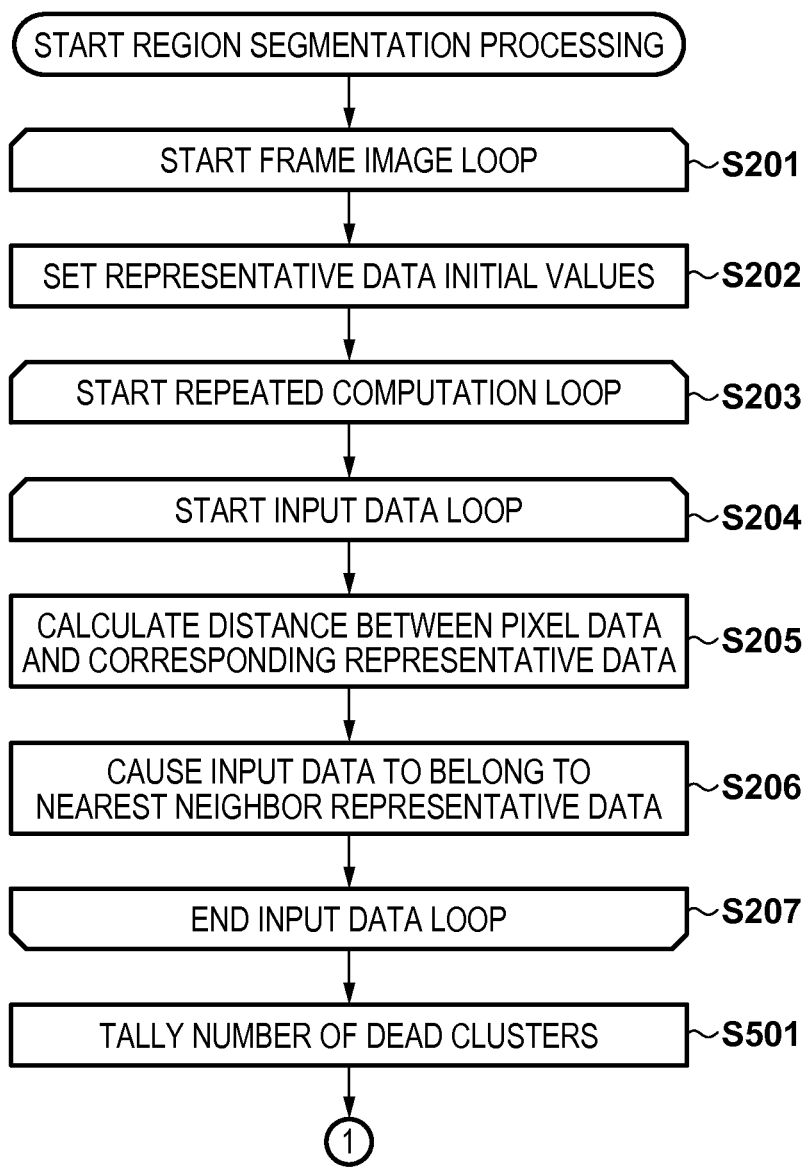
FIGS. 5A and 5B are a flowchart for illustrating processing (Second Variation) for correcting a portion or all representative data.
Figure 5B:
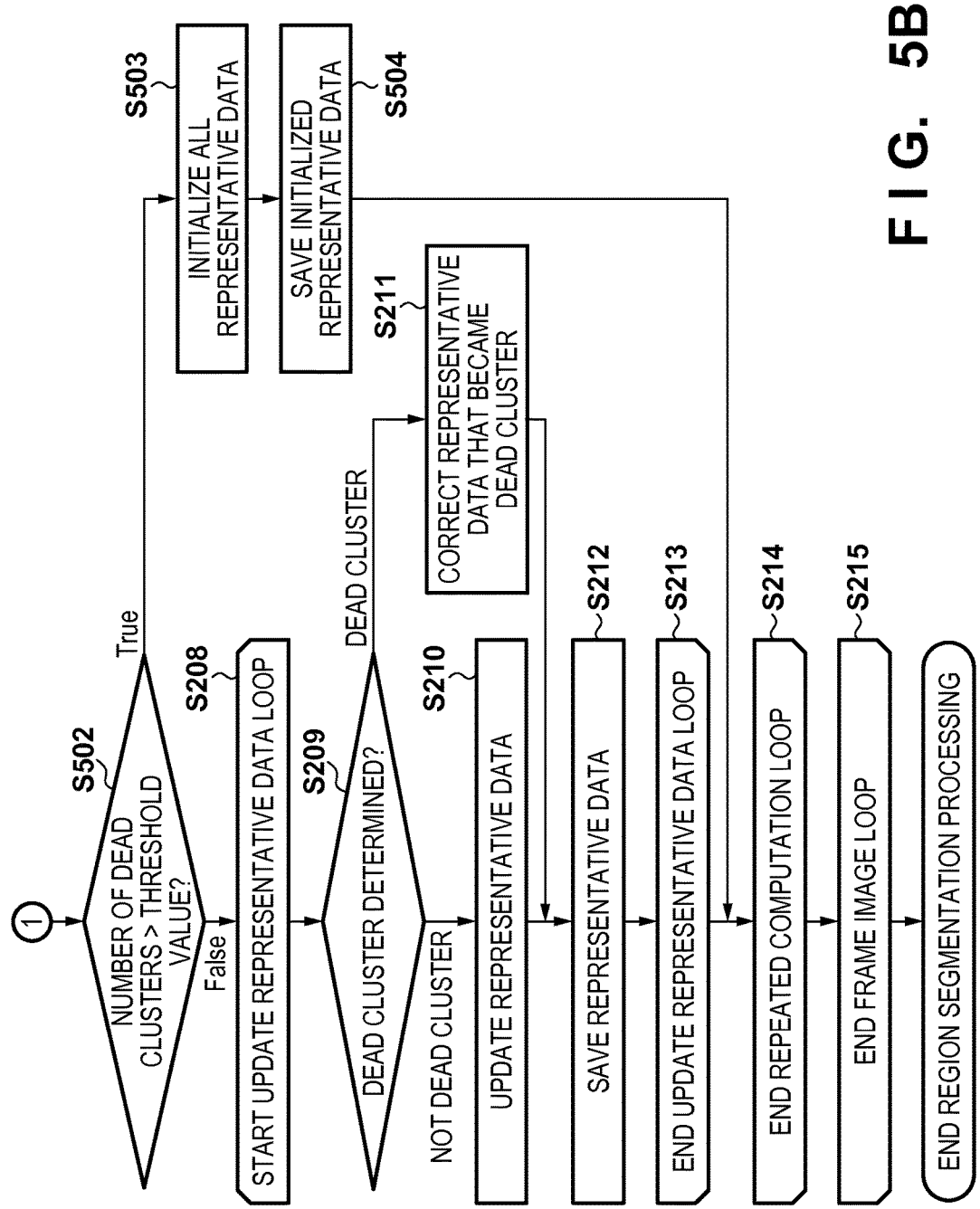

The processing for correcting each representative data item that became a dead cluster as illustrated in FIG. 2 and the processing for correcting the representative data in one batch as illustrated in FIG. 4 may be combined. In other words, configuration may be taken such that the representative data update unit 114 changes all of the plurality of representative data items if the number of dead clusters exceeds a threshold value, and changes the representative data determined to be a dead cluster if the number of dead clusters is not more than the threshold value. Explanation is given of an example of such processing with reference to the flowchart of FIGS. 5A and 5B. Note that, in FIGS. 5A and 5B, the same reference numerals are added for processing that is similar to the processing illustrated in the flowchart of FIG. 2. Also, steps S501-S503 are for processing similar to that of step S401 to step S403 in FIG. 4.

In step S501, the representative data update unit 114 counts the number of representative data items that became dead clusters. Next, in step S502, the representative data update unit 114 determines whether or not the number of dead clusters counted in step S501 exceeds a predetermined threshold value. If the number of dead clusters exceeds a predetermined threshold value, the processing proceeds to step S503, and the representative data update unit 114 performs processing to initialize all of the representative data. Then, the processing proceeds to step S504, and the initialized representative data is saved in the representative data storage unit 112. Meanwhile, if the number of dead clusters is not more than a predetermined threshold value, the processing proceeds to step S208. In step S208 to in step S213, as described above with FIG. 2, update processing is performed on representative data that is not a dead cluster, and correction processing is performed on dead cluster representative data, and representative data updated by the update processing or the correction processing is saved in the representative data storage unit 112.

<Third Variation>

Figure 6B:
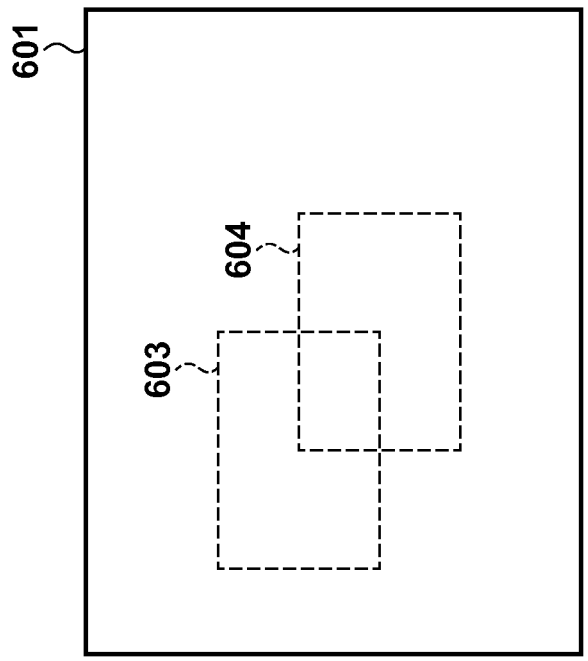
FIGS. 6A and 6B are views for explaining partial regions in accordance with a third variation.
Figure 6A:
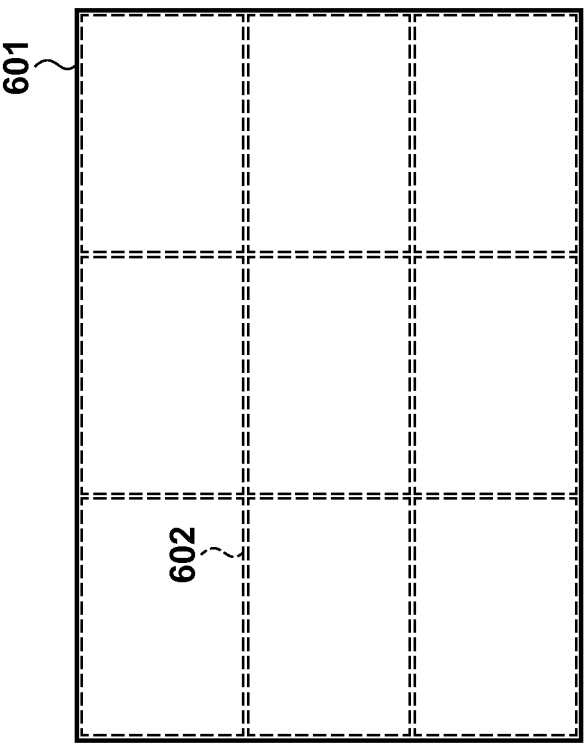

In the first variation, the number of dead clusters for the whole of the processing target image is counted, and correction of representative data is performed in one batch, but limitation is not made to this. For example, configuration may be taken such that partial regions are set as is illustrated in FIGS. 6A and 6B, the number of dead clusters is tallied for each partial region, and the representative data is corrected partially. In other words, if the number of dead clusters belonging to a partial region exceeds a threshold value, the representative data update unit 114 corrects the representative data belonging to that partial region. Here, in the correction of the representative data that belongs to the partial region, all of the representative data that belongs to that partial region is corrected. Note that, similarly to the second variation, a configuration in which only the representative data that became a dead cluster is corrected for a partial region in which the number of dead clusters is not more than a threshold value may be added. Reference numeral 601 indicates image data, and the dotted line indicates a partial region. FIG. 6A is an example of setting partial regions at equal intervals, a partial region 602 is arranged in equal intervals: 3 horizontally and 3 vertically. Note that a partial region setting may cause them to overlap each other as with a partial region 603 and a partial region 604 of FIG. 6B.

Figure 7:
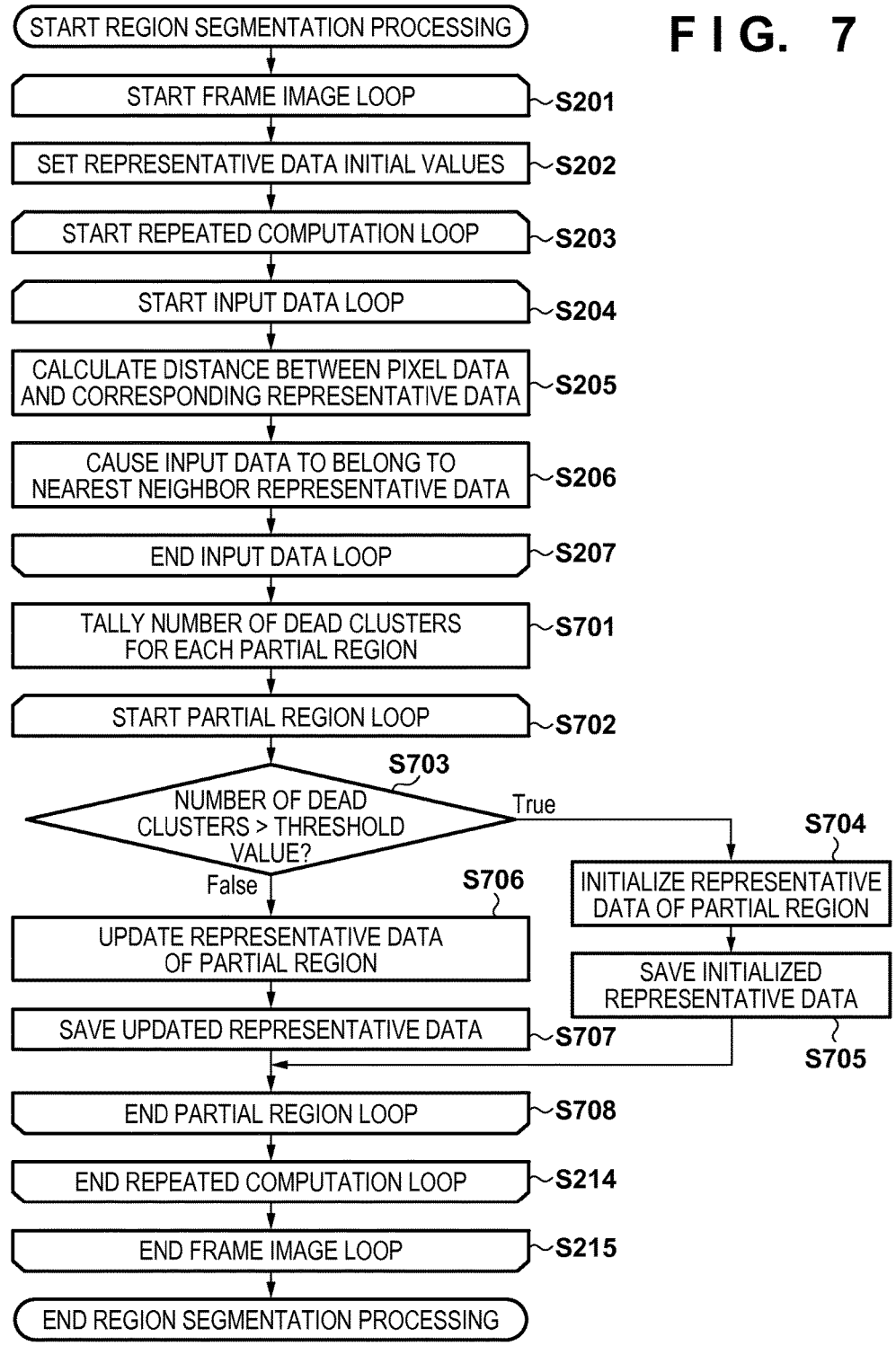
FIG. 7 is a flowchart for illustrating partial region correction processing in accordance with a third variation.

FIG. 7 is a flowchart for correction of each partial region. Note that, in FIG. 7, the same reference numerals are added for processing that is similar to the processing illustrated in the flowchart of FIG. 2. In step S701, the number of representative data items that became a dead cluster is counted for each partial region. In step S702, a loop for correcting a partial region is started. Next, in step S703, the representative data update unit 114 determines whether or not the number of dead clusters for one of the plurality of partial regions exceeds a predetermined threshold value. If the number of dead clusters in the partial region exceeds the predetermined threshold value, the processing proceeds to step S704, and the representative data update unit 114 initializes the representative data of the partial region that is the target. Then, in step S705, and the representative data update unit 114 saves the initialized representative data in the representative data storage unit 112.

Meanwhile, if, in step S703, the number of dead clusters in the partial region exceeds the predetermined threshold value, the processing proceeds to step S706. In step S706, the representative data update unit 114 updates the representative data included in the partial region by the method explained in step S210. In step S707, the representative data update unit 114 saves the representative data updated in step S706 in the representative data storage unit 112. In step S708, the termination of the loop for correcting a partial region is determined. If the above described processing (updating, correcting of representative data) terminates for all set partial regions, the processing proceeds to step S214, and if there is an unprocessed partial region, the processing returns to step S703.

The representative data that is made to be the target of correction is not limited to representative data for which a dead cluster occurs, and all representative data or a portion of the representative data may be selected and made to be the target of correction, as in the first to third variations.

<Fourth Variation>

Figure 9:
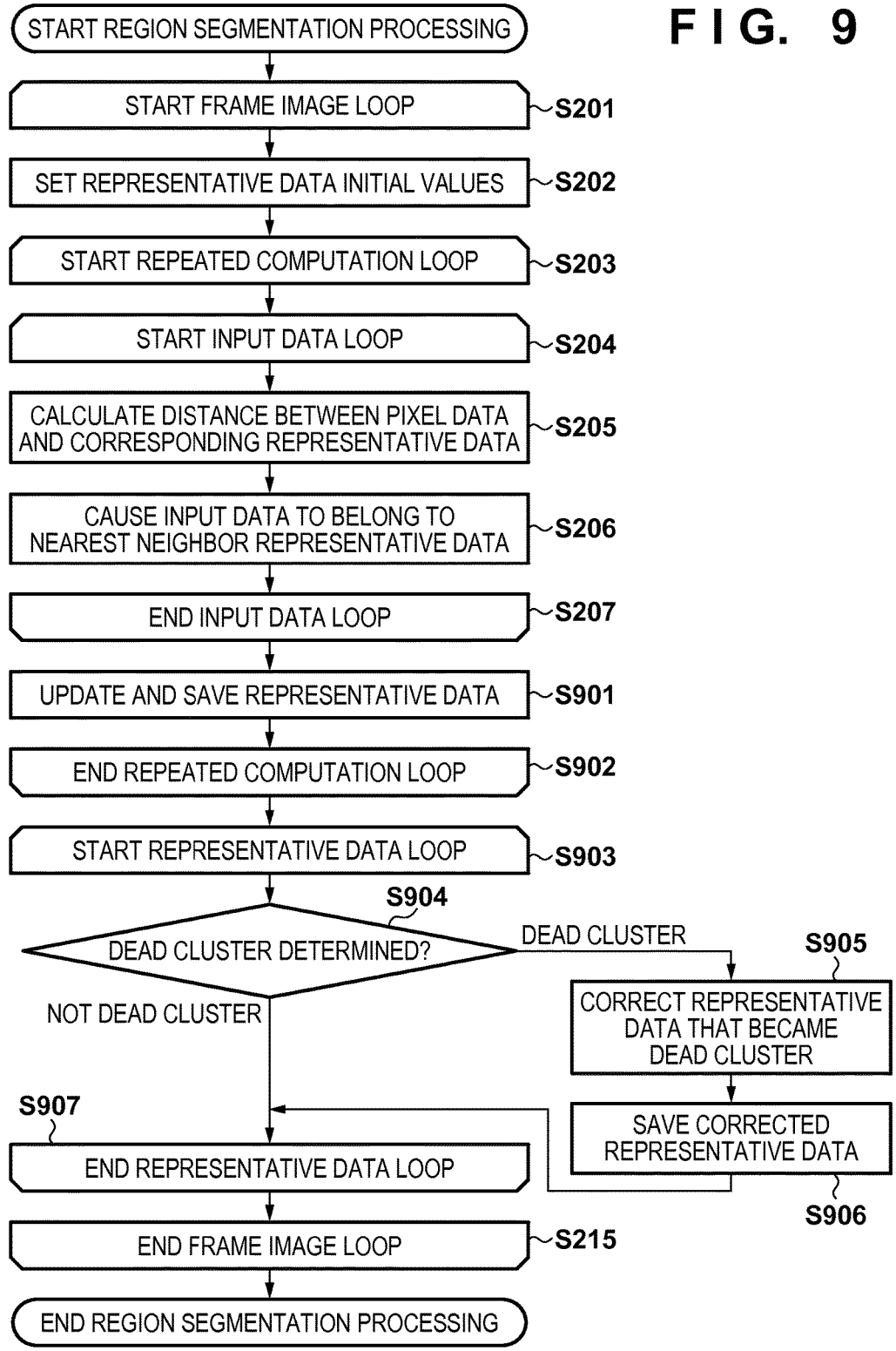
FIG. 9 is a flowchart for illustrating correction processing (Fourth Variation) between frame images.

Using FIG. 2, FIG. 4, FIGS. 5A and 5B, and FIG. 7, explanation was given for dead cluster correction methods, but the timing at which to correct the representative data that became a dead cluster is during the repeated computation loop for all of these. In other words, configuration is taken so that for an image, clustering and updating of representative data is executed a plurality of times, and correction of representative data corresponding to a dead cluster is performed upon each of these executions. However, the timing at which the representative data is corrected need not be during looping of the repeated computation. For example, correction may be performed at the end of the processing of each frame image. In other words, the representative data update unit 114 may be configured to change representative data corresponding to a dead cluster after completion of repetition of a plurality of times of clustering and updating of representative data. FIG. 9 indicates an example for correcting representative data at the end of processing of each frame image based on the processing of FIG. 2. The flow differs from the flowchart of FIG. 2 from after step S208.

In step S901, all of the representative data is updated and saved to the representative data storage unit 112. This processing is similar to step S210 and step S212 in FIG. 2. In step S902, the clustering processing unit 113 determines the termination of the repeated computation loop based on whether or not the repetition count becomes a predetermined number of times, for example, or whether or not the result of the clustering processing is that a predetermined convergence condition is satisfied. If it is determined that the repeated computation loop terminates, the processing proceeds to step S903, and if it is determined that it has not terminated, the processing returns to step S204. Unlike processing explained in FIG. 2, the subsequent processing of step S903 to step S907 is performed without the determination and the correction of dead clusters being performed during the image data repeated computation loop. In other words, after repetition of a plurality of times execution of the loop, which includes clustering by the clustering processing unit 113 and updating the representative data by the representative data update unit 114, has completed, correction of the representative data corresponding to the dead cluster is executed.

In step S903, starts the representative data loop in order to deal with dead clusters. In this loop, for the plurality of representative data items, one by one, the processing of step S904 to step S906 is executed. Firstly, in step S904, the representative data update unit 114 performs a dead cluster determination for one representative data item selected from the plurality of representative data items. If the selected representative data is a dead cluster, the processing proceeds to step S905, and if not, the processing proceeds to step S907.

In step S905, the representative data update unit 114 corrects representative data item determined to be a dead cluster. This processing is the same as that of step S211.

Then, in step S906, and the representative data update unit 114 saves the corrected representative data in the representative data storage unit 112.

Other Embodiments

In the embodiments described above and each variation, the functional configuration illustrated in FIG. 1 may be realized by dedicated hardware, and may be realized by a CPU executing a predetermined program, i.e. by software processing by a CPU. If realized by software processing, it is possible to use an information processing apparatus as illustrated in FIG. 10, for example.

FIG. 10 is a block diagram for illustrating an example configuration of a computing device 1001 as an information processing apparatus that comprises a function capable of executing the region segmentation method according to the present invention. Reference numeral 1002 denotes a CPU which manages control of the apparatus on the whole. Reference numeral 1003 denotes a ROM (read-only memory), that stores a boot program, a BIOS or the like. Reference numeral 1004 denotes a RAM (random access memory) that is used as a work area of the CPU 1002. Reference numeral 1005 denotes a hard disk drive (HDD), which stores various data such as an OS, and an application for generating block segmentation information. Reference numeral 1006 denotes a keyboard, and reference numeral 1007 denotes a mouse, and these function as user interfaces. Reference numeral 1008 denotes a display control unit, into which a video memory and a display controller are built, and which drives a display apparatus 1009 to display. Reference numeral 1009 denotes the display apparatus, which receives image signals from the display control unit 1008, and displays. Reference numeral 1010 denotes an interface for communicating with various external devices. The above configurations are connected to a bus 1011, and are capable of two-way communication of data thereby.

In the computing device 1001, a program that causes the CPU 1002 to execute the processing illustrated in the flowchart of FIG. 2, for example, is loaded into the RAM 1004, and executed by the CPU 1002. Input image data is stored in the RAM 1004 or the HDD 1005, and processed. Alternatively, input image data input from a camera (not shown) via the interface 1010 is stored in the RAM 1004 and processed. Each process performed by the representative data initialization unit 111, the clustering processing unit 113, and the representative data update unit 114 is executed by the CPU 1002. The result storage unit 102 is realized by the RAM 1004 or the HDD 1005. Also, the representative data storage unit 112 is realized by the RAM 1004 or a local memory the CPU (not shown) or the like. Note that the HDD 1005 may be used for cases where the number of representative data items is large.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-243376, filed Dec. 1, 2014 which is hereby incorporated by reference herein in its entirety.

What is claimed is:

1. A region segmentation apparatus for segmenting an image into a plurality of regions, the apparatus comprising:
 one or more processors; and
 a memory coupled to the one or more processors, the memory having stored thereon instructions which, when executed by the one or more processors, cause the apparatus to:
 cluster each pixel in the image to one of a plurality of representative data items based on respective pixel data;
 based on pixel data belonging to a representative data item as a result of the clustering, update the representative data item for a next clustering;
 determine whether by the clustering a state in which a dead cluster should be resolved occurs; and
 if it is determined that the state in which the dead cluster should be resolved occurs, change representative data corresponding to the dead cluster to resolve the state using pixel data of a specific position corresponding to a position of the representative data corresponding to the dead cluster.

2. The apparatus according to claim 1, wherein
 the clustering and the updating of the representative data are executed a plurality of times for the image, and
 the instructions, when executed by the one or more processors, further cause the apparatus to, on each execution of the clustering, determine whether a state in which a dead cluster should be resolved occurs, and, if it is determined that the state in which the dead cluster should be resolved occurs, change representative data corresponding to the dead cluster in order to resolve the state.

3. The apparatus according to claim 1, wherein the instructions, when executed by the one or more processors, further cause the apparatus to determine whether or not each of the plurality of representative data items is a dead cluster, and change representative data determined to be a dead cluster.

4. The apparatus according to claim 1, wherein the instructions, when executed by the one or more processors, further cause the apparatus to:

determine whether or not the number of dead clusters exceeds a threshold value, and if the number of dead clusters exceeds the threshold value, change all of the plurality of representative data items.

5. The apparatus according to claim 4, wherein the instructions, when executed by the one or more processors, further cause the apparatus to, if the number of dead clusters is not more than the threshold value, not change any of the plurality of representative data items.

6. The apparatus according to claim 4, wherein the instructions, when executed by the one or more processors, further cause the apparatus to, if the number of dead clusters is not more than the threshold value, change representative data determined to be a dead cluster.

7. The apparatus according to claim 1, wherein the instructions, when executed by the one or more processors, further cause the apparatus to:

set a plurality of partial regions in the image, and determine whether or not the number of dead clusters that belong to respective partial regions exceeds a threshold value, and if the number of dead clusters exceeds the threshold value, change all of the representative data items that belong to the respective partial region.

8. The apparatus according to claim 7, wherein the instructions, when executed by the one or more processors, further cause the apparatus to, for a partial region in which the number of dead clusters is not more than the threshold value, change representative data determined to be a dead cluster.

9. The apparatus according to claim 1, wherein the clustering and the updating of the representative data are executed a plurality of times for the image, and the instructions, when executed by the one or more processors, further cause the apparatus to, after execution of the plurality of times completes, determine whether a state in which a dead cluster should be resolved occurs, and, if it is determined that the state in which the dead cluster should be resolved occurs, change representative data corresponding to the dead cluster in order to resolve the state.

10. The apparatus according to claim 1, wherein the specific position corresponding to the position of the representative data is selected from pixel data of a plurality of specific positions set in advance in relation to a plurality of representative data items.

11. The apparatus according to claim 10, wherein the instructions, when executed by the one or more processors, further cause the apparatus to, using pixel data of a specific position corresponding to a position of representative data that is a change target, and pixel data of specific positions corresponding to respective positions of representative data items in a periphery of the position of the representative data that is the change target, from pixel data of a plurality of specific positions set in advance in relation to a plurality of representative data items, change the representative data that is the change target.

12. The apparatus according to claim 10, wherein the clustering is executed on a plurality of images input sequentially, upon clustering of a new image, representative data updated after clustering a previous image is taken over, and the plurality of specific positions are initial positions set when clustering is executed for a first image in the plurality of images.

13. The apparatus according to claim 1, wherein the instructions, when executed by the one or more processors, further cause the apparatus to, using pixel data selected randomly in a specific range, from a plurality of specific ranges set in advance in relation to a plurality of representative data items, that corresponds to a position of representative data that is a change target, change the representative data that is the change target.

14. The apparatus according to claim 1, wherein the instructions, when executed by the one or more processors, further cause the apparatus to change representative data that is a change target based on representative data in a periphery of the representative data that is the change target.

15. A region segmentation method performed by a region segmentation apparatus for segmenting an image into a plurality of regions, the method comprising:

clustering each pixel in the image to one of a plurality of representative data items based on respective pixel data;

based on pixel data belonging to a representative data item as a result of the clustering, updating the representative data item for a next clustering;

determining whether by the clustering a state in which a dead cluster should be resolved occurs; and if it is determined that the state in which the dead cluster should be resolved occurs, changing representative data corresponding to the dead cluster to resolve the state using pixel data of a specific position corresponding to a position of the representative data corresponding to the dead cluster.

16. A non-transitory computer readable storage medium storing a program for causing a computer to execute a region segmentation method for segmenting an image into a plurality of regions, the method comprising:

clustering each pixel in the image to one of a plurality of representative data items based on respective pixel data;

based on pixel data belonging to a representative data item as a result of the clustering, updating the representative data item for a next clustering;

determining whether by the clustering a state in which a dead cluster should be resolved occurs; and if it is determined that the state in which the dead cluster should be resolved occurs, changing representative data corresponding to the dead cluster to resolve the state using pixel data of a specific position corresponding to a position of the representative data corresponding to the dead cluster.

* * * * *